United States Patent
Meng et al.

(10) Patent No.: US 10,120,467 B2
(45) Date of Patent: Nov. 6, 2018

(54) TOUCH DISPLAY DRIVING METHOD, DRIVING MODULE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Chen Meng, Beijing (CN); Xiaobo Xie, Beijing (CN); Tiankuo Shi, Beijing (CN); Hao Zhang, Beijing (CN); Lingyun Shi, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 15 days.

(21) Appl. No.: 15/124,903

(22) PCT Filed: Jan. 5, 2016

(86) PCT No.: PCT/CN2016/070095
§ 371 (c)(1),
(2) Date: Sep. 9, 2016

(87) PCT Pub. No.: WO2017/012293
PCT Pub. Date: Jan. 26, 2017

(65) Prior Publication Data
US 2017/0185178 A1    Jun. 29, 2017

(30) Foreign Application Priority Data
Jul. 17, 2015 (CN) .......................... 2015 1 0423464

(51) Int. Cl.
G06F 3/041 (2006.01)
G09G 5/00 (2006.01)
G06F 1/32 (2006.01)

(52) U.S. Cl.
CPC ............ *G06F 3/041* (2013.01); *G06F 1/3262* (2013.01); *G06F 3/0416* (2013.01); *G09G 5/00* (2013.01); *G09G 2310/0264* (2013.01)

(58) Field of Classification Search
None
See application file for complete search history.

(56) References Cited

U.S. PATENT DOCUMENTS

2011/0025619 A1* 2/2011 Joguet .................. G06F 1/3262
                                                                    345/173
2016/0246431 A1* 8/2016 Ma ......................... G06F 3/044

FOREIGN PATENT DOCUMENTS

CN    101903857 A    12/2010
CN    103109314 A     5/2013
(Continued)

OTHER PUBLICATIONS

International Search Report dated Apr. 29, 2016 issued in corresponding International Application No. PCT/Cn2016/070095 along with an English translation of the Written Opinion of the International Searching Authority.

(Continued)

*Primary Examiner* — Kenneth B Lee, Jr.
(74) *Attorney, Agent, or Firm* — Nath, Goldberg & Meyer; Joshua B. Goldberg (57) ABSTRACT

The present invention discloses a touch display driving method, a driving module and a display device. The method includes: detecting whether a touch action occurs; performing display driving and touch driving in a first driving mode when no touch action is detected; performing display driving and touch driving in a second driving mode when a touch (Continued)

action is detected, wherein a touch driving frequency under the first driving mode is smaller than a touch driving frequency under the second driving mode. In the present invention, driving is performed in the first driving mode when no touch action is detected, and driving is performed in the second driving mode when a touch action is detected. A touch driving frequency under the first driving mode is smaller than a touch driving frequency under the second driving mode, which decreases driving frequency as a whole, thereby reducing power consumption of a driving module.

15 Claims, 3 Drawing Sheets

(56) References Cited

FOREIGN PATENT DOCUMENTS

| | | |
|---|---|---|
| CN | 103558941 A | 2/2014 |
| CN | 104063105 A | 9/2014 |
| CN | 104991675 A | 10/2015 |
| JP | 2007087393 A | 4/2007 |

OTHER PUBLICATIONS

First Office Action dated Jul. 17, 2017 corresponding to Chinese application No. 201510423464.8.

* cited by examiner

TOUCH DISPLAY DRIVING METHOD, DRIVING MODULE AND DISPLAY DEVICE

CROSS-REFERENCES TO RELATED APPLICATIONS

This is a National Phase Application filed under 35 U.S.C. 371 as a national stage of PCT/CN2016/070095, filed Jan. 5, 2016, an application claiming the benefit of Chinese Application No. 201510423464.8, filed Jul. 17, 2015, the content of each of which is hereby incorporated by reference in its entirety.

TECHNICAL FIELD

The present invention relates to the field of display technology, and in particular relates to a touch display driving method, a driving module and a display device.

BACKGROUND

At present, full-in-cell display device can realize a combination of a display function and a touch sensing function by means of H-blank, that is, realize a touch sensing function by detecting a touch action in an H-blank stage.

In the prior art, a driving module, e.g. a touch-with-display driver (TDDI), generally detects a touch action in an H-blank stage by employing a progressive scanning method. This scanning method results in a high driving frequency.

In the prior art, for each frame of image, the driving module generally realizes display driving and touch driving processes with a fixed driving frequency, which results in a high driving frequency.

To summarize, a driving method of the prior art increases a driving frequency, and thereby increases power consumption of a driving module.

SUMMARY

The present invention provides a touch display driving method, a driving module and a display device, for the purpose of reducing power consumption of a driving module.

To realize the above object, the present invention provides a touch display driving method, including:

detecting whether or not a touch action occurs;

performing display driving and touch driving in a first driving mode when no touch action is detected;

performing display driving and touch driving in a second driving mode when a touch action is detected, wherein a touch driving frequency under the first driving mode is smaller than a touch driving frequency under the second driving mode.

Optionally, performing display driving and touch driving in a first driving mode comprises: outputting display data of touch rows for display in a plurality of successive display stages, and outputting a touch driving signal for touch in one H-blank stage following the plurality of successive display stages; and performing display driving and touch driving in a second driving mode comprises: outputting display data of a touch row for display in each display stage, and outputting a touch driving signal for touch in an H-blank stage following the display stage.

Optionally, outputting display data of touch rows for display in a plurality of successive display stages, and outputting a touch driving signal for touch in one H-blank stage following the plurality of successive display stages comprises: outputting display data of touch rows for display in two successive display stages, and outputting a touch driving signal for touch in one H-blank stage following the two successive display stages.

Optionally, performing display driving and touch driving in a first driving mode comprises: outputting display data of a touch row for display in a display stage and outputting a touch driving signal for touch in an H-blank stage with a first frame frequency; and performing display driving and touch driving in a second driving mode comprises: outputting display data of a touch row for display in a display stage and outputting a touch driving signal for touch in an H-blank stage with a second frame frequency; wherein the first frame frequency is smaller than the second frame frequency.

Optionally, the second frame frequency is twice as large as the first frame frequency.

To realize the above object, the present invention provides a driving module, comprising: a touch driving unit and a display driving unit;

the touch driving unit is used for detecting whether or not a touch action occurs, performing touch driving in a first driving mode when no touch action is detected, and performing touch driving in a second driving mode when a touch action is detected;

the display driving unit is used for performing display driving in the first driving mode when the touch driving unit detects no touch action, and performing display driving in the second driving mode when the touch driving unit detects a touch action, a touch driving frequency under the first driving mode being smaller than a touch driving frequency under the second driving mode.

Optionally, the display driving unit is used for outputting display data of a touch row for display in a display stage; and when the touch driving unit detects no touch action, the touch driving unit is used for outputting a touch driving signal for touch in one H-blank stage following a plurality of display stages; and when the touch driving unit detects a touch action, the touch driving unit is used for outputting a touch driving signal for touch in an H-blank stage following each display stage.

Optionally, the display driving unit comprises a gate driver and a source driver; the display data comprises a gate driving signal and a source driving signal; and the gate driver is used for outputting the gate driving signal of a touch row in a display stage; the source driver is used for outputting the source driving signal of a touch row in a display stage.

Optionally, when the touch driving unit detects no touch action, the display driving unit is used for outputting display data of a touch row for display in a display stage with a first frame frequency; the touch driving unit is used for outputting a touch driving signal for touch with the first frame frequency in an H-blank stage following the display stage; and when the touch driving unit detects a touch action, the display driving unit is used for outputting display data of a touch row for display in a display stage with a second frame frequency; the touch driving unit is used for outputting a touch driving signal for touch with the second frame frequency in an H-blank stage following the display stage, the first frame frequency being smaller than the second frame frequency.

Optionally, the second frame frequency is twice as large as the first frame frequency.

Optionally, the display driving unit comprises a gate driver and a source driver; the display data comprises a gate driving signal and a source driving signal;

when the touch driving unit detects no touch action, the gate driver is used for outputting the gate driving signal of a touch row in a display stage with the first frame frequency; the source driver is used for outputting the source driving signal of a touch row in a display stage with the first frame frequency; and when the touch driving unit detects a touch action, the gate driver is used for outputting the gate driving signal of a touch row in a display stage with the second frame frequency; the source driver is used for outputting the source driving signal of a touch row in a display stage with the second frame frequency.

To realize the above object, the present invention provides a display device, comprising: a display panel and the above driving module.

The present invention has the following beneficial effects:

In the technical solutions of the touch display driving method, the driving module and the display device provided by the present invention, driving is performed in a first driving mode when no touch action is detected, and driving is performed in a second driving mode when a touch action is detected. A driving frequency under the first driving mode is smaller than a driving frequency under the second driving mode, which decreases a driving frequency, thereby reducing power consumption of a driving module.

DETAILED DESCRIPTION

In order to provide a better understanding of the technical solutions of the present invention to those skilled in the art, a touch display driving method, a driving module and a display device provided by the present invention is described in further detail below in conjunction with the drawings.

Figure 1:
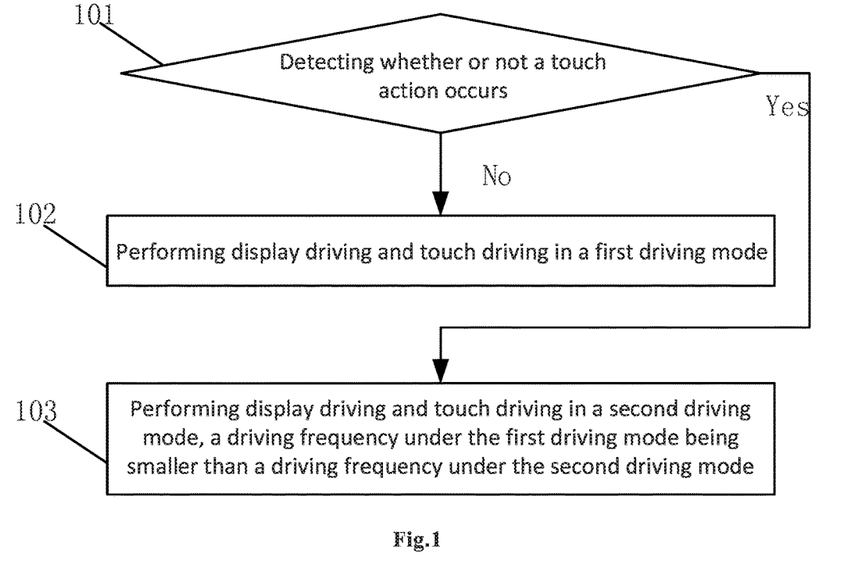
FIG. 1 is a flow chart of a touch display driving method provided by Embodiment 1 of the present invention.

FIG. 1 is a flow chart of a touch display driving method provided by Embodiment 1 of the present invention. As shown in FIG. 1, the method includes the following steps.

Step 101: detecting whether or not a touch action occurs, if not, then proceeding to Step 102; if yes, then proceeding to Step 103.

Steps of this embodiment may be performed by a driving module.

Step 102: performing display driving and touch driving in a first driving mode. Then, the process ends.

Step 103: performing display driving and touch driving in a second driving mode, a driving frequency under the first driving mode being smaller than a driving frequency under the second driving mode.

In the technical solution of the touch display driving method provided by this embodiment, driving is performed in the first driving mode when no touch action is detected, and driving is performed in the second driving mode when a touch action is detected. The touch driving frequency under the first driving mode is smaller than the touch driving frequency under the second driving mode, which decreases the driving frequency as a whole, thereby reducing power consumption of a driving module.

Figure 2:
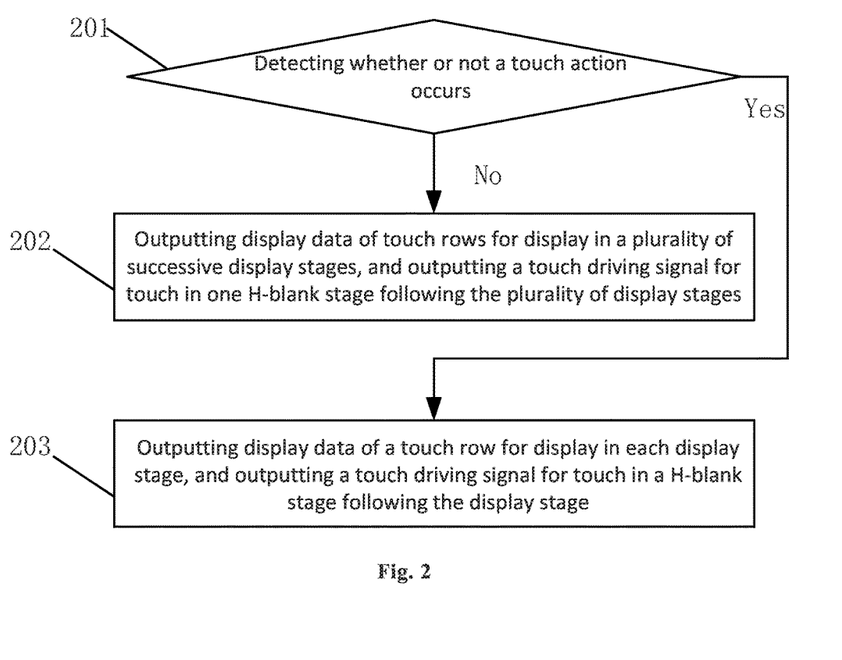
FIG. 2 is a flow chart of a touch display driving method provided by Embodiment 2 of the present invention.

FIG. 2 is a flow chart of a touch display driving method provided by Embodiment 2 of the present invention. As shown in FIG. 2, the method includes the following steps.

Step 201: detecting whether or not a touch action occurs, if not, then proceeding to Step 202; if yes, then proceeding to Step 203.

Steps of this embodiment may be performed by a driving module. Preferably, the driving module is a TDDI. The driving module may be used for driving a display panel, such that the display panel realizes display and touch functions. The display panel may include a color filter substrate and an array substrate provided opposite to each other, and the array substrate may include a base substrate and gate lines and data lines on the base substrate, the gate lines and the data lines defining pixel units.

Step 202: outputting display data of touch rows for display in a plurality of successive display stages, and outputting a touch driving signal for touch in one H-blank stage following the plurality of display stages. Then the process ends.

Here, all the gate lines may be divided into a plurality of groups of gate lines, each group of gate lines including several gate lines. Then each group of gate lines is one touch row, in other words, one touch row may include multiple gate lines. For example, one array substrate may include 12 touch rows.

In this embodiment, the display data may include a gate driving signal and a source driving signal.

In this embodiment, the H-blank stage is a long H-blank (LH-blank) stage.

Preferably, in this step, display data of touch rows are outputted for display in two successive display stages, and a touch driving signal is outputted for touch in one H-blank stage following the two display stages.

Figure 3:
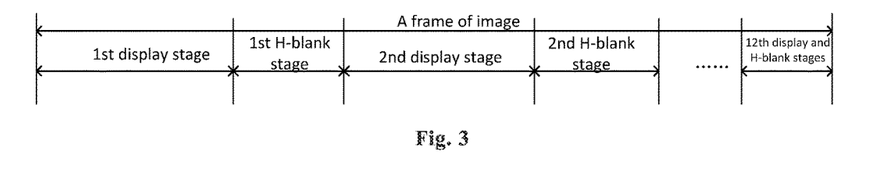
FIG. 3 is a schematic diagram of display stages and H-blank stages in the present invention.

FIG. 3 is a schematic diagram of display stages and H-blank stages in the present invention. As shown in FIG. 3, a display panel including 12 touch rows is taken as an example, and there is one H-blank stage following a display stage of each touch row. In a first display stage, the driving module outputs display data of a first touch row to the display panel for the display panel to display; and in a first H-blank stage, the driving module does not output a touch driving signal. In a second display stage, the driving module outputs display data of a second touch row to the display panel for the display panel to display; and in a second H-blank stage, the driving module outputs a touch driving signal for touch, and if a touch action is detected in the second H-blank stage, the driving module receives a sensing signal generated by the touch. The rest can be done in the same manner up to a twelfth display stage and a following twelfth H-blank stage. Shown in FIG. 3 is a scheme in which touch driving is performed every other row. Since touch driving is performed every other row, a touch driving frequency in an H-blank stage is smaller than a display driving frequency in a display stage.

Step 203: outputting display data of a touch row for display in each display stage, and outputting a touch driving signal for touch in an H-blank stage following the display stage.

As shown in FIG. 3, in a first display stage, the driving module outputs display data of a first touch row to the display panel for the display panel to display; and in a first H-blank stage, the driving module outputs a touch driving signal for touch, and if a touch action is detected in the first H-blank stage, the driving module receives a sensing signal generated by the touch. In a second display stage, the driving module outputs display data of a second touch row to the display panel for the display panel to display; and in a second H-blank stage, the driving module outputs a touch driving signal for touch, and if a touch action is detected in the second H-blank stage, the driving module receives a sensing signal generated by the touch. The rest can be done in the same manner up to a twelfth display stage and a following twelfth H-blank stage. Step 203 is a scheme in which touch driving is performed row by row. Since touch driving is performed row by row, a touch driving frequency in an H-blank stage is equal to a display driving frequency in a display stage.

In this embodiment, Steps 201 to 203 are performed repeatedly, to complete display and touch processes for a frame of image. Thereafter, one may continue to perform display and touch processes for a next frame of image.

In this embodiment, if no touch action is detected by the driving module, display driving and touch driving are performed in the first driving mode, and in this case, a touch driving frequency in an H-blank stage is smaller than a display driving frequency in a display stage; if a touch action is detected by the driving module, display driving and touch driving are performed in the second driving mode, and in this case, a touch driving frequency in an H-blank stage is equal to a display driving frequency in a display stage. It can be seen from the above that, the display driving frequencies of the display stages under the two driving modes are equal, but the touch driving frequency of the H-blank stage under the first driving mode is smaller than the touch driving frequency of the H-blank stage under the second driving mode, so that the driving frequency under the first driving mode is smaller than the driving frequency under the second driving mode.

In the technical solution of the touch display driving method provided by this embodiment, display data of touch rows are outputted in a plurality of successive display stages when no touch action is detected, and a touch driving signal is outputted in one H-blank stage following the plurality of display stages. This embodiment employs a scheme in which touch driving is performed one time every a few rows, which decreases a driving frequency of an H-blank stage, thereby reducing power consumption of a driving module.

Figure 4:
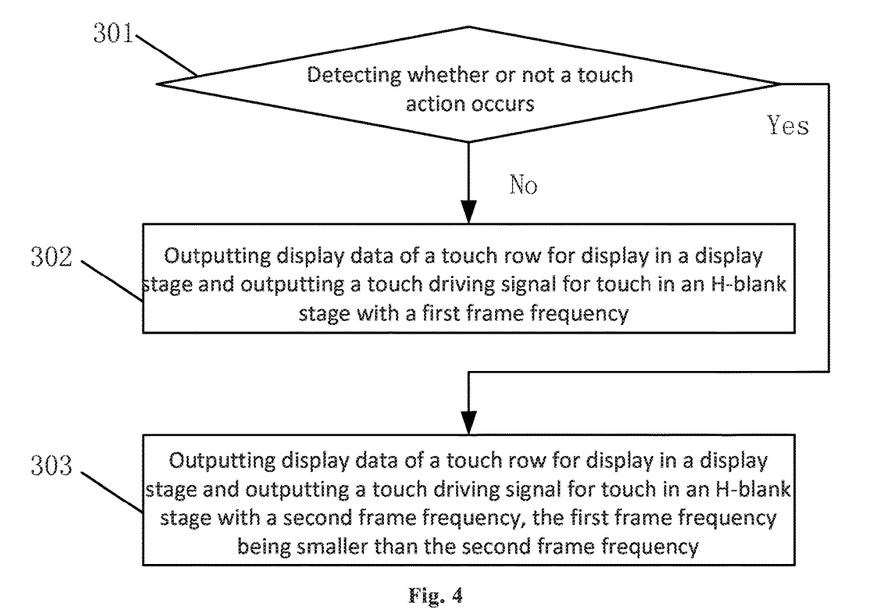
FIG. 4 is a flow chart of a touch display driving method provided by Embodiment 3 of the present invention.

FIG. 4 is a flow chart of a touch display driving method provided by Embodiment 3 of the present invention. As shown in FIG. 4, the method includes the following steps.

Step 301: detecting whether or not a touch action occurs, if not, then proceeding to Step 302; if yes, then proceeding to Step 303.

Steps of this embodiment may be performed by a driving module. Preferably, the driving module is a TDDI. The driving module may be used for driving a display panel, such that the display panel realizes display and touch functions. The display panel may include a color filter substrate and an array substrate provided opposite to each other, and the array substrate may include a base substrate and gate lines and data lines on the base substrate, the gate lines and the data lines defining pixel units.

Step 302: in a case where no touch action is detected, outputting display data of a touch row for display in a display stage and outputting a touch driving signal for touch in an H-blank stage with a first frame frequency. Then the process ends.

Here, all the gate lines may be divided into groups of gate lines, each group of gate lines including several gate lines. Then each group of gate lines is one touch row, in other words, one touch row may include multiple gate lines. For example, one array substrate may include 12 touch rows.

In this embodiment, the display data may include a gate driving signal and a source driving signal.

In this embodiment, the H-blank stage is a long H-blank (LH-blank) stage.

As shown in FIG. 3, in a first display stage, the driving module performs display driving with a first frame frequency, that is, the driving module outputs display data of a first touch row to the display panel with the first frame frequency for the display panel to display; in a first H-blank stage, the driving module performs touch driving with the first frame frequency, that is, the driving module outputs a touch driving signal for touch with the first frame frequency. In a second display stage, the driving module performs display driving with the first frame frequency, that is, the driving module outputs display data of a first touch row to the display panel with the first frame frequency for the display panel to display; in a second H-blank stage, the driving module performs touch driving with the first frame frequency, that is, the driving module outputs a touch driving signal for touch with the first frame frequency. The rest can be done in the same manner up to a twelfth display stage and a following twelfth H-blank stage.

Step 303: in a case where a touch action is detected, outputting display data of a touch row for display in a display stage and outputting a touch driving signal for touch in an H-blank stage with a second frame frequency, the first frame frequency being smaller than the second frame frequency.

As shown in FIG. 3, in a first display stage, the driving module performs display driving with a second frame frequency, that is, the driving module outputs display data of a first touch row to the display panel with the second frame frequency for the display panel to display; in a first H-blank stage, the driving module performs touch driving with the second frame frequency, that is, the driving module outputs a touch driving signal for touch with the second frame frequency, and the driving module receives a sensing signal generated by the touch. In a second display stage, the driving module performs display driving with the second frame frequency, that is, the driving module outputs display data of a first touch row to the display panel with the second frame frequency for the display panel to display; in a second H-blank stage, the driving module performs touch driving with the second frame frequency, that is, the driving module outputs a touch driving signal for touch with the second frame frequency, and the driving module receives a sensing signal generated by the touch. The rest can be done in the same manner up to a twelfth display stage and a following twelfth H-blank stage.

Preferably, the second frame frequency is twice as large as the first frame frequency. For example, the first frame frequency is 60 Hz, and the second frame frequency is 120 Hz. In this embodiment, Steps 301 to 303 are performed repeatedly, to complete display and touch processes for a frame of image. Thereafter, one may continue to perform display and touch processes for a next frame of image.

In this embodiment, if no touch action is detected by the driving module, display driving and touch driving are performed in a first driving mode, and in this case, the driving module outputs display data of a touch row for display in a display stage and outputs a touch driving signal for touch in an H-blank stage with the first frame frequency; if a touch action is detected by the driving module, display driving and touch driving are performed in a second driving mode, and in this case, the driving module outputs display data of a touch row for display in a display stage and outputs a touch driving signal for touch in an H-blank stage with the second frame frequency. It can be seen from the above that under the first driving mode, the driving module performs driving with the first frame frequency in both the display stage and the H-blank stage; whereas, under the second driving mode, the driving module performs driving with the second frame frequency in both the display stage and the H-blank stage. Since the first frame frequency is smaller than the second frame frequency, a driving frequency of the display stage and the H-blank stage under the first driving mode is smaller than a driving frequency of the display stage and the H-blank stage under the second driving mode. The frequency-changing driving scheme employed in this embodiment can effectively decrease the driving frequency.

In the technical solution of the touch display driving method provided by this embodiment, driving is performed with a first frame frequency when no touch action is detected, and driving is performed with a second frame frequency when a touch action is detected, the first frame frequency being smaller than the second frame frequency. In this embodiment, driving is performed with the smaller first frame frequency when no touch action is detected, which decreases a driving frequency of the display stage and the H-blank stage, thereby reducing power consumption of the driving module.

Figure 5:
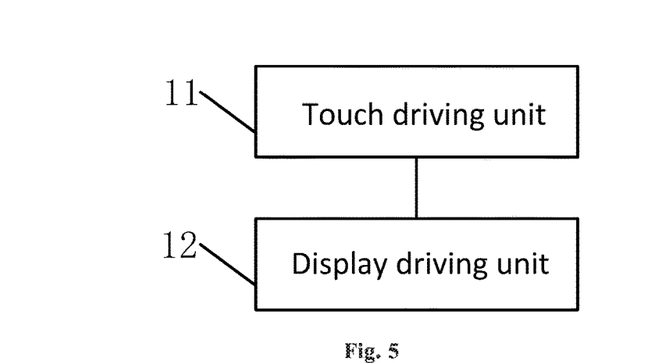
FIG. 5 is a schematic diagram of a structure of a driving module provided by Embodiment 4 of the present invention.

FIG. 5 is a schematic diagram of a structure of a driving module provided by Embodiment 4 of the present invention. As shown in FIG. 5, the driving module includes a touch driving unit 11 and a display driving unit 12.

The touch driving unit 11 is used for detecting whether or not a touch action occurs, touch driving is performed in a first driving mode when no touch action is detected, and touch driving is performed in a second driving mode when a touch action is detected. The display driving unit 12 is used for performing display driving in the first driving mode when the touch driving unit 11 detects no touch action, and performing display driving in the second driving mode when the touch driving unit 11 detects a touch action. A driving frequency under the first driving mode is smaller than a driving frequency under the second driving mode.

Optionally, when the touch driving unit 11 detects no touch action, the display driving unit 12 is used for outputting display data of touch rows for display in a plurality of successive display stages; the touch driving unit 11 is used for outputting a touch driving signal for touch in one H-blank stage following the plurality of successive display stages. When the touch driving unit 11 detects a touch action, the display driving unit 12 is used for outputting display data of a touch row for display in each display stage, and the touch driving unit 11 is used for outputting a touch driving signal for touch in an H-blank stage following the display stage.

Specifically, the display driving unit 12 includes a gate driver (gate IC) and a source driver (source IC); the display data includes a gate driving signal and a source driving signal. And in this case, the touch driving unit 11 is a touch driver (touch IC). The gate driver is used for outputting a gate driving signal of a touch row in a display stage, and the source driver is used for outputting a source driving signal of a touch row in a display stage. In this case, the gate driver, the source driver and the touch driver are provided separately, rather than integrated in one module. This case is not illustrated in detail in the drawings.

Or optionally, when the touch driving unit 11 detects no touch action, the display driving unit 12 is used for outputting display data of a touch row for display in a display stage with a first frame frequency; the touch driving unit 11 is used for outputting a touch driving signal for touch with the first frame frequency in an H-blank stage. When the touch driving unit 11 detects a touch action, the display driving unit 12 is used for outputting display data of a touch row for display in a display stage with a second frame frequency, and the touch driving unit 11 is used for outputting a touch driving signal for touch with the second frame frequency in an H-blank stage. The first frame frequency is smaller than the second frame frequency. Preferably, the second frame frequency is twice as large as the first frame frequency.

Specifically, the display driving unit 12 includes a gate driver and a source driver; the display data includes a gate driving signal and a source driving signal. And in this case, the touch driving unit 11 is a touch driver (touch IC). When the touch driving unit 11 detects no touch action, the gate driver is used for outputting a gate driving signal of a touch row in a display stage with the first frame frequency; the source driver is used for outputting a source driving signal of a touch row in a display stage with the first frame frequency; when the touch driving unit 11 detects a touch action, the gate driver is used for outputting a gate driving signal of a touch row in a display stage with the second frame frequency; the source driver is used for outputting a source driving signal of a touch row in a display stage with the second frame frequency. In this case, the gate driver, the source driver and the touch driver are provided separately, rather than integrated in one module. This case is not illustrated in detail in the drawings.

The driving module provided by the present embodiment may be used to realize the above touch display driving method of Embodiment 1, Embodiment 2 or. Embodiment 3, and for detailed description thereof, one can refer to Embodiment 1, Embodiment 2 or Embodiment 3, which is not repeated herein.

In the technical solution of the driving module provided by this embodiment, driving is performed in a first driving mode when no touch action is detected, driving is performed in a second driving mode when a touch action is detected, and a touch driving frequency under the first driving mode is smaller than a touch driving frequency under the second driving mode, which decreases a driving frequency as a whole, thereby reducing power consumption of the driving module.

Embodiment 5 of the present invention provides a display device including a display panel and a driving module. The driving module may be the driving module provided in the above Embodiment 4, which is not repeated herein.

Here, the driving module may be used for performing display driving and touch driving on the display panel. Preferably, the display panel may include a color filter substrate and an array substrate provided opposite to each other. Preferably, the display device is a full-in-cell display device.

In the technical solution of the display device provided by this embodiment, driving is performed in a first driving mode when no touch action is detected, driving is performed in a second driving mode when a touch action is detected, and a touch driving frequency under the first driving mode is smaller than a touch driving frequency under the second driving mode, which decreases a driving frequency as a whole, thereby reducing power consumption of the driving module.

It can be understood that the foregoing implementations are merely exemplary implementations used for describing the principle of the present invention, but the present invention is not limited thereto. Those of ordinary skill in the art may make various variations and modifications without departing from the spirit and essence of the present invention, and these variations and modifications shall fall into the protection scope of the present invention.

The invention claimed is:

1. A touch display driving method, comprising:
   detecting whether a touch action occurs;
   performing display driving and touch driving in a first driving mode, when no touch action is detected; and
   performing display driving and touch driving in a second driving mode when a touch action is detected, wherein a first touch driving frequency under the first driving mode is smaller than a second touch driving frequency under the second driving mode,
   wherein performing display driving and touch driving in the first driving mode comprises: outputting display data of touch rows for display in a plurality of successive display stages, and outputting a touch driving signal for touch in one H-blank stage following the plurality of successive display stages; and
   performing display driving and touch driving in the second driving mode comprises: outputting display data of a touch row for display in each display stage, and outputting the touch driving signal for touch in an H-blank stage following the display stage.

2. The touch display driving method according to claim 1, wherein outputting display data of touch rows for display in a plurality of successive display stages, and outputting a touch driving signal for touch in one H-blank stage following the plurality of successive display stages comprises: outputting display data of touch rows for display in two successive display stages, and outputting the touch driving signal for touch in one H-blank stage following the two successive display stages.

3. A touch display driving method, comprising:
   detecting whether a touch action occurs;
   performing display driving and touch driving in a first driving mode, when no touch action is detected; and
   performing display driving and touch driving in a second driving mode when a touch action is detected, wherein a first touch driving frequency under the first driving mode is smaller than a second touch driving frequency under the second driving mode,
   wherein performing display driving and touch driving in the first driving mode comprises: outputting display data of a touch row for display in a display stage and outputting a touch driving signal for touch in an H-blank stage with a first frame frequency; and
   performing display driving and touch driving in the second driving mode comprises: outputting display data of a touch row for display in a display stage and outputting the touch driving signal for touch in an H-blank stage with a second frame frequency;
   wherein the first frame frequency is smaller than the second frame frequency.

4. The touch display driving method according to claim 3, wherein the second frame frequency is twice as large as the first frame frequency.

5. A driving module, configured for performing the touch display driving method according to claim 1, the driving module comprising: a touch driving unit and a display driving unit; wherein,
   the touch driving unit is configured for detecting whether the touch action occurs, performing touch driving in the first driving mode when no touch action is detected, and performing touch driving in the second driving mode when a touch action is detected; and
   the display driving unit is configured for performing display driving in the first driving mode when the touch driving unit detects no touch action, and performing display driving in the second driving mode when the touch driving unit detects a touch action, the first touch driving frequency under the first driving mode being smaller than the second touch driving frequency under the second driving mode;
   wherein the display driving unit is configured for outputting display data of a touch row for display in a display stage; and
   when the touch driving unit detects no touch action, the touch driving unit is configured for outputting the touch driving signal for touch in one H-blank stage following a plurality of display stages; and when the touch driving unit detects a touch action, the touch driving unit is configured for outputting the touch driving signal for touch in an H-blank stage following each display stage.

6. The driving module according to claim 5, wherein the display driving unit comprises a gate driver and a source driver; the display data comprises a gate driving signal and a source driving signal; and
   the gate driver is configured for outputting a gate driving signal of a touch row in a display stage; a source driver is configured for outputting the source driving signal of a touch row in a display stage.

7. A driving module, configured for performing the touch display driving method according to claim 3, the driving module, comprising: a touch driving unit and a display driving unit: wherein,
   the touch driving unit is configured for detecting whether the touch action occurs, performing touch driving in the first driving mode when no touch action is detected, and performing touch driving in the second driving mode when a touch action is detected; and
   the display driving unit is configured for performing display driving in the first driving mode when the touch driving unit detects no touch action, and performing display driving in the second driving mode when the touch driving unit detects a touch action, wherein the first touch driving frequency under the first driving mode is smaller than second touch driving frequency under the second driving mode,
   wherein, when the touch driving unit detects no touch action, the display driving unit is configured for outputting display data of a touch row for display in a display stage with the first frame frequency; the touch driving unit is configured for outputting the touch driving signal for touch with the first frame frequency in an H-blank stage following the display stage; and
   when the touch driving unit detects a touch action, the display driving unit is configured for outputting display data of a touch row for display in a display stage with the second frame frequency; the touch driving unit is configured for outputting the touch driving signal for touch with the second frame frequency in an H-blank stage following the display stage, the first frame frequency being smaller than the second frame frequency.

8. The driving module according to claim 7, wherein the second frame frequency is twice as large as the first frame frequency.

9. The driving module according to claim 7, wherein the display driving unit comprises a gate driver and a source driver; the display data comprises a gate driving signal and a source driving signal;
  when the touch driving unit detects no touch action, the gate driver is configured for outputting the gate driving signal of a touch row in a display stage with the first frame frequency; the source driver is configured for outputting the source driving signal of a touch row in a display stage with the first frame frequency; and
  when the touch driving unit detects a touch action, the gate driver is configured for outputting the gate driving signal of a touch row in a display stage with the second frame frequency; the source driver is configured for outputting the source driving signal of a touch row in a display stage with the second frame frequency.

10. The driving module according to claim 8, wherein the display driving unit comprises a gate driver and a source driver; the display data comprises a gate driving signal and a source driving signal;
  when the touch driving unit detects no touch action, the gate driver is configured for outputting the gate driving signal of a touch row in a display stage with the first frame frequency; the source driver is configured for outputting the source driving signal of a touch row in a display stage with the first frame frequency; and
  when the touch driving unit detects a touch action, the gate driver is configured for outputting the gate driving signal of a touch row in a display stage with the second frame frequency; the source driver is configured for outputting the source driving signal of a touch row in a display stage with the second frame frequency.

11. A display device, comprising: a display panel and a driving module according to claim 5, the driving module comprising the touch driving unit and the display driving unit; wherein,
  the touch driving unit is configured for detecting whether or not the touch action occurs, performing touch driving in the first driving mode when no touch action is detected, and performing touch driving in the second driving mode when a touch action is detected; and
  the display driving unit is configured for performing display driving in the first driving mode when the touch driving unit detects no touch action, and performing display driving in the second driving mode when the touch driving unit detects a touch action, the first touch driving frequency under the first driving mode being smaller than the second touch driving frequency under the second driving mode;
  wherein the display driving unit is configured for outputting display data of a touch row for display in a display stage; and
  when the touch driving unit detects no touch action, the touch driving unit is configured for outputting a touch driving signal for touch in one H-blank stage following a plurality of display stages: and when the touch driving unit detects a touch action, the touch driving unit is configured for outputting the touch driving signal for touch in an H-blank stage following each display stage.

12. The display device according to claim 11, wherein the display driving unit comprises a gate driver and a source driver; the display data comprises a gate driving signal and a source driving signal; and
  the gate driver is configured for outputting the gate driving signal of a touch row in a display stage; the source driver is configured for outputting the source driving signal of a touch row in a display stage.

13. A display device, comprising: a display panel and the driving module according to claim 7, the driving module comprising the touch driving unit and the display driving unit; wherein
  the touch driving unit is configured for detecting whether or not the touch action occurs, performing touch driving in the first driving mode when no touch action is detected, and performing touch driving in the second driving mode when a touch action is detected; and
  the display driving unit is configured for performing display driving in the first driving mode when the touch driving unit detects no touch action, and performing display driving in the second driving mode when the touch driving unit detects a touch action, wherein the first touch driving frequency under the first driving mode is smaller than the second touch driving frequency under the second driving mode,
  wherein, when the touch driving unit detects no touch action, the display driving unit is configured for outputting display data of a touch row for display in a display stage with the first frame frequency; the touch driving unit is configured for outputting the touch driving signal for touch with the first frame frequency in an H-blank stage following the display stage; and
  when the touch driving unit detects a touch action, the display driving unit is configured for outputting display data of a touch row for display in a display stage with the second frame frequency; the touch driving unit is configured for outputting the touch driving signal for touch with the second frame frequency in an H-blank stage following the display stage, the first frame frequency being smaller than the second frame frequency.

14. The display device according to claim 13, wherein the second frame frequency is twice as large as the first frame frequency.

15. The display device according to claim 13, wherein the display driving unit comprises a gate driver and a source driver; the display data comprises a gate driving signal and a source driving signal;
  when the touch driving unit detects no touch action, the gate driver is configured for outputting the gate driving signal of a touch row in a display stage with the first frame frequency; the source driver is configured for outputting the source driving signal of a touch row in a display stage with the first frame frequency; and
  when the touch driving unit detects a touch action, the gate driver is configured for outputting the gate driving signal of a touch row in a display stage with the second frame frequency; the source driver is configured for outputting the source driving signal of a touch row in a display stage with the second frame frequency.

* * * * *